United States Patent
Chung et al.

(10) Patent No.: US 11,716,801 B1
(45) Date of Patent: Aug. 1, 2023

(54) LED ILLUMINATION DEVICE FOR RAPIDLY RELEASING RESIDUAL CAPACITANCE

(71) Applicant: PARAGON SEMICONDUCTOR LIGHTING TECHNOLOGY CO., LTD., New Taipei (TW)

(72) Inventors: Chia-Tin Chung, Miaoli County (TW); Pei-Chun Liu, New Taipei (TW)

(73) Assignee: PARAGON SEMICONDUCTOR LIGHTING TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/702,805

(22) Filed: Mar. 24, 2022

(30) Foreign Application Priority Data

Jan. 18, 2022 (TW) .................................. 111200624

(51) Int. Cl.
*H05B 45/3725* (2020.01)
*H05B 45/40* (2020.01)
*H02M 7/06* (2006.01)

(52) U.S. Cl.
CPC ......... *H05B 45/3725* (2020.01); *H05B 45/40* (2020.01); *H02M 7/06* (2013.01)

(58) Field of Classification Search
CPC ...... H05B 45/3725; H05B 45/37; H02M 7/06
See application file for complete search history.

(56) References Cited

U.S. PATENT DOCUMENTS

| | | | | |
|---|---|---|---|---|
| 10,039,159 | B1 * | 7/2018 | Xiong | H05B 45/37 |
| 2013/0320880 | A1 * | 12/2013 | Walker | H05B 45/3725 |
| | | | | 363/125 |
| 2017/0367158 | A1 * | 12/2017 | Petersen | H05K 1/189 |
| 2020/0288549 | A1 * | 9/2020 | Hsia | H05B 45/357 |
| 2021/0227663 | A1 * | 7/2021 | Zhou | H05B 45/30 |

FOREIGN PATENT DOCUMENTS

| | | | | |
|---|---|---|---|---|
| WO | WO-2019062782 | A1 * | 4/2019 | F21K 9/272 |
| WO | WO-2020088521 | A1 * | 5/2020 | H05B 45/3578 |

* cited by examiner

*Primary Examiner* — Abdullah A Riyami
*Assistant Examiner* — Syed M Kaiser
(74) *Attorney, Agent, or Firm* — Li & Cai Intellectual Property Office

(57) ABSTRACT

An LED illumination device for rapidly releasing residual capacitance, which includes a bridge rectifier chip, a current-limiting chip, a light-emitting group, a resistor group and a capacitor. The light-emitting group includes a plurality of first and second LED chips. The resistor group includes a plurality of first and second resistor chips. The first working voltage of the first LED chip is different from the second working voltage of the second LED chip. The first resistance value of the first resistor chip is different from the second resistance value of the second resistor chip. Each first LED chip corresponds to one of the first resistor chips, and each second LED chip corresponds to one of the second resistor chips. When the power supply is turned off, the residual capacitance remaining in the capacitor can be released by cooperation of the first resistor chips and the second resistor chips.

10 Claims, 7 Drawing Sheets

LED ILLUMINATION DEVICE FOR RAPIDLY RELEASING RESIDUAL CAPACITANCE

CROSS-REFERENCE TO RELATED PATENT APPLICATION

This application claims the benefit of priority to Taiwan Patent Application No. 111200624, filed on Jan. 18, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an LED (light-emitting diode) illumination device, and more particularly to an LED illumination device for rapidly releasing residual capacitance.

BACKGROUND OF THE DISCLOSURE

In the related art, when the power of the LED illumination device is turned off, the residual capacitance remaining in the capacitor can continue to supply power to a plurality of LED chips, so that each LED chip will generate a weak light source.

SUMMARY OF THE DISCLOSURE

In response to the above-referenced technical inadequacy, the present disclosure provides a LED illumination device for rapidly releasing residual capacitance.

In one aspect, the present disclosure provides an LED illumination device for rapidly releasing residual capacitance, which includes a circuit substrate, a bridge rectifier chip, a current-limiting chip, a light-emitting group, a resistor group and a capacitor. The bridge rectifier chip is disposed on the circuit substrate, for converting an alternating current provided by a power supply into a direct current. The current-limiting chip is disposed on the circuit substrate and electrically connected to the bridge rectifier chip and at least one current-limiting resistor, for limiting a current quantity of the direct current. The light-emitting group includes a plurality of first LED chips and a plurality of second LED chips, and all of the first LED chips and the second LED chips are disposed on the circuit substrate and electrically connected between the bridge rectifier chip and the current-limiting chip. The resistor group includes a plurality of first resistor chips and a plurality of second resistor chips, and all of the first resistor chips and the second resistor chips are disposed on the circuit substrate and electrically connected between the bridge rectifier chip and the current-limiting chip. The capacitor is disposed on the circuit substrate and electrically connected between the bridge rectifier chip and the current-limiting chip. The light-emitting group, the resistor group and the capacitor are arranged in parallel. The first LED chips have a same first working voltage, the second LED chips have a same second working voltage, and the first working voltage of the first LED chip is different from the second working voltage of the second LED. The first resistor chips have a same first resistance value, the second resistor chips have a same second resistance value, and the first resistance value of the first resistor chip is different from the second resistance value of the second resistor chip. Each of the first LED chips corresponds to one of the first resistor chips, and each of the second LED chips corresponds to one of the second resistor chips. When the power supply is configured to stop supplying power to the LED illumination device, the residual capacitance remaining in the capacitor is released by cooperation of the first resistor chips and the second resistor chips, so that all of the first LED chips and the second LED chips are completely turned off within 2 seconds without generating a light source.

In another aspect, the present disclosure provides an LED illumination device for rapidly releasing residual capacitance, which includes a bridge rectifier chip, a current-limiting chip, a light-emitting group, a resistor group and a capacitor. The current-limiting chip is electrically connected to the bridge rectifier chip. The light-emitting group is electrically connected between the bridge rectifier chip and the current-limiting chip, and the light-emitting group includes a plurality of first LED chips and a plurality of second LED chips. The resistor group is electrically connected between the bridge rectifier chip and the current-limiting chip, and the resistor group includes a plurality of first resistor chips and a plurality of second resistor chips. The capacitor is electrically connected between the bridge rectifier chip and the current-limiting chip. The light-emitting group, the resistor group and the capacitor are arranged in parallel. The first LED chips have a same first working voltage, the second LED chips have a same second working voltage, and the first working voltage of the first LED chip is different from the second working voltage of the second LED. The first resistor chips have a same first resistance value, the second resistor chips have a same second resistance value, and the first resistance value of the first resistor chip is different from the second resistance value of the second resistor chip. Each of the first LED chips corresponds to one of the first resistor chips, and each of the second LED chips corresponds to one of the second resistor chips.

In certain embodiments, the first LED chips respectively correspond to the first resistor chips, and each of the first LED chips and the corresponding one of the first resistor chips are arranged in parallel. The second LED chips respectively correspond to the second resistor chips, and each of the second LED chips and the corresponding one of the second resistor chips are arranged in parallel. The first LED chips and the second LED chips are alternately arranged in series, and the first resistor chips and the second resistor chips are alternately arranged in series. When the first working voltage of the first LED chip is greater than the second working voltage of the second LED chip, the first resistance value of the first resistor chip is greater than the second resistance value of the second resistor chip. When the first working voltage of the first LED chip is smaller than the second working voltage of the second LED chip, the first resistance value of the first resistor chip is smaller than the second resistance value of the second resistor chip. A ratio of the first working voltage of the first LED chip to the second working voltage of the second LED chip is equal to a ratio of the first resistance value of the first resistor chip to the second resistance value of the second resistor chip.

In certain embodiments, the first LED chips respectively correspond to the first resistor chips, and each of the first LED chips and the corresponding one of the first resistor chips are arranged in parallel. The second LED chips respectively correspond to the second resistor chips, and each of the second LED chips and the corresponding one of the second resistor chips are arranged in parallel. The first LED chips are sequentially arranged in series to form a first light-emitting group, and the first resistor chips are sequentially arranged in series to form a first resistor group. The second LED chips are sequentially arranged in series to form a second light-emitting group, and the second resistor chips are sequentially arranged in series to form a second resistor group. The first light-emitting group is electrically connected between the bridge rectifier chip and the second light-emitting group, and the second light-emitting group is electrically connected between the first light-emitting group and the current-limiting chip. The first resistor group is electrically connected between the bridge rectifier chip and the second resistor group, and the second resistor group is electrically connected between the first resistor group and the current-limiting chip. When the first working voltage of the first LED chip is greater than the second working voltage of the second LED chip, the first resistance value of the first resistor chip is greater than the second resistance value of the second resistor chip. When the first working voltage of the first LED chip is smaller than the second working voltage of the second LED chip, the first resistance value of the first resistor chip is smaller than the second resistance value of the second resistor chip. A ratio of the first working voltage of the first LED chip to the second working voltage of the second LED chip is equal to a ratio of the first resistance value of the first resistor chip to the second resistance value of the second resistor chip.

In certain embodiments, the first LED chips are divided into a plurality of first LED chip groups, and each of the first LED chip groups includes at least two of the first LED chips arranged in parallel. The second LED chips are divided into a plurality of second LED chip groups, and each of the second LED chip groups includes at least two of the second LED chips arranged in parallel. The first LED chip groups respectively correspond to the first resistor chips, and each of the first LED chip groups and the corresponding one of the first resistor chips are arranged in parallel. The second LED chip groups respectively correspond to the second resistor chips, and each of the second LED chip groups and the corresponding one of the second resistor chips are arranged in parallel. The first LED chip groups are alternately arranged in series, and the first resistor chips are alternately arranged in series. The second LED chip groups are alternately arranged in series, and the second resistor chips are alternately arranged in series. When the first working voltage of the first LED chip is greater than the second working voltage of the second LED chip, the first resistance value of the first resistor chip is greater than the second resistance value of the second resistor chip. When the first working voltage of the first LED chip is smaller than the second working voltage of the second LED chip, the first resistance value of the first resistor chip is smaller than the second resistance value of the second resistor chip. A ratio of the first working voltage of the first LED chip to the second working voltage of the second LED chip is equal to a ratio of the first resistance value of the first resistor chip to the second resistance value of the second resistor chip.

In certain embodiments, the first LED chips are divided into a plurality of first LED chip groups, and each of the first LED chip groups includes at least two of the first LED chips arranged in parallel. The second LED chips are divided into a plurality of second LED chip groups, and each of the second LED chip groups includes at least two of the second LED chips arranged in parallel. The first LED chip groups respectively correspond to the first resistor chips, and each of the first LED chip groups and the corresponding one of the first resistor chips are arranged in parallel. The second LED chip groups respectively correspond to the second resistor chips, and each of the second LED chip groups and the corresponding one of the second resistor chips are arranged in parallel. The first LED chip groups are sequentially arranged in series to form a first light-emitting group, and the first resistor chips are sequentially arranged in series to form a first resistor group. The second LED chip groups are sequentially arranged in series to form a second light-emitting group, and the second resistor chips are sequentially arranged in series to form a second resistor group. The first light-emitting group is electrically connected between the bridge rectifier chip and the second light-emitting group, and the second light-emitting group is electrically connected between the first light-emitting group and the current-limiting chip. The first resistor group is electrically connected between the bridge rectifier chip and the second resistor group, and the second resistor group is electrically connected between the first resistor group and the current-limiting chip. When the first working voltage of the first LED chip is greater than the second working voltage of the second LED chip, the first resistance value of the first resistor chip is greater than the second resistance value of the second resistor chip. When the first working voltage of the first LED chip is smaller than the second working voltage of the second LED chip, the first resistance value of the first resistor chip is smaller than the second resistance value of the second resistor chip. A ratio of the first working voltage of the first LED chip to the second working voltage of the second LED chip is equal to a ratio of the first resistance value of the first resistor chip to the second resistance value of the second resistor chip.

Therefore, in the LED illumination device provided by the present disclosure, by virtue of the light-emitting group including a plurality of first LED chips and a plurality of second LED chips, the resistor group including a plurality of first resistor chips and a plurality of second resistor chips, the light-emitting group, the resistor group and the capacitor being arranged in parallel, the first working voltage of the first LED chip being different from the second working voltage of the second LED chip, the first resistance value of the first resistor chip being different from the second resistance value of the second resistor chip, each of the first LED chips corresponding to one of the first resistor chips, and each of the second LED chips corresponding to one of the second resistor chips, when the power supply is configured to stop supplying power to the LED illumination device, the residual capacitance remaining in the capacitor is released by cooperation of the first resistor chips and the second resistor chips, so that all of the first LED chips and the second LED chips are completely turned off within a predetermined time without generating any light source.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
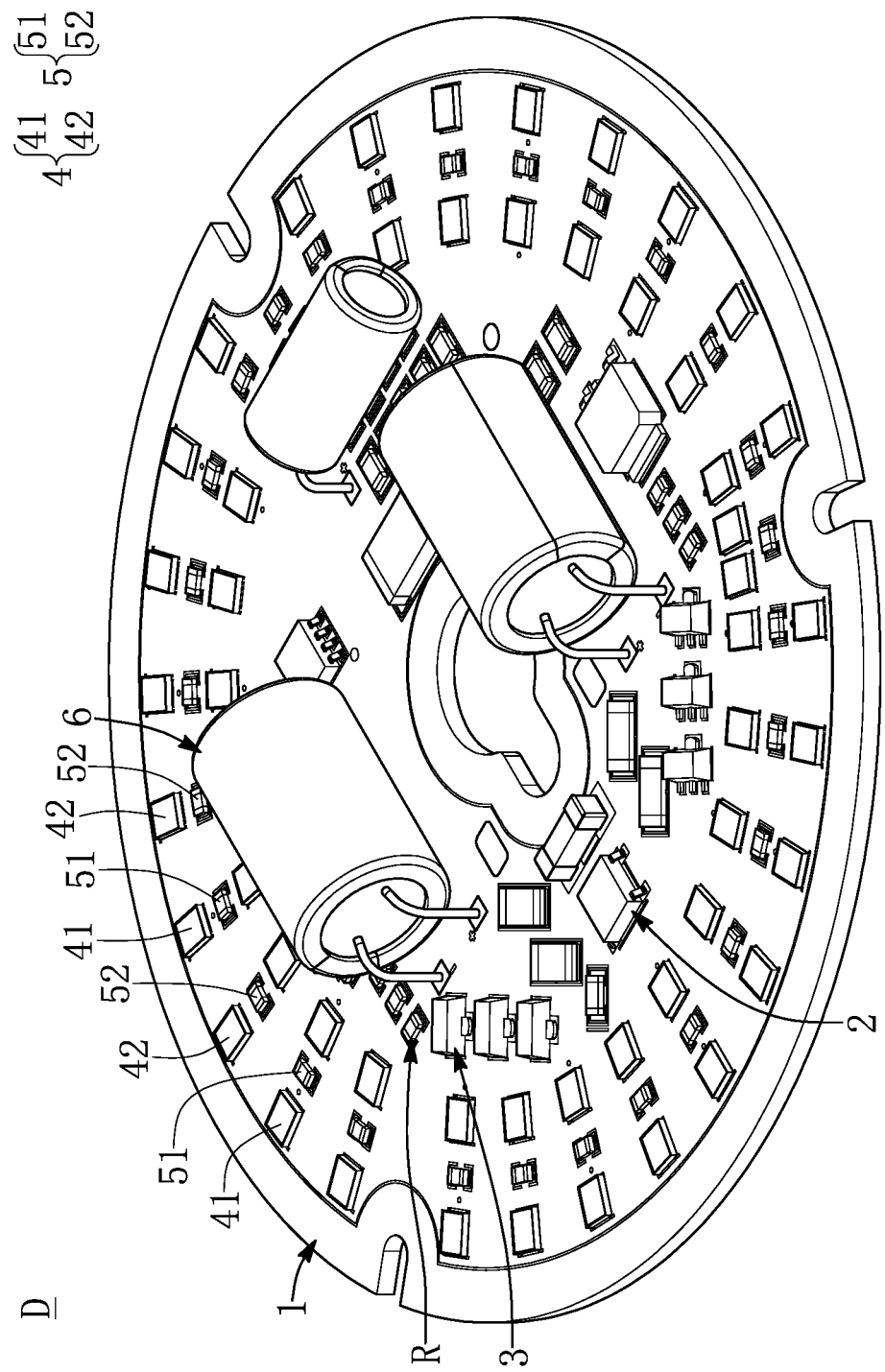
FIG. 1 is a schematic perspective view of an LED illumination device for rapidly releasing residual capacitance according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 7, the present disclosure provides an LED illumination device D including a bridge rectifier chip 2, a current-limiting chip 3, a light-emitting group 4, a resistor group 5 and a capacitor 6. The current-limiting chip 3 is electrically connected to the bridge rectifier chip 2. The light-emitting group 4, the resistor group 5 and the capacitor 6 are arranged in parallel and electrically connected between the bridge rectifier chip 2 and the current-limiting chip 3. The light-emitting group 4 includes a plurality of first LED chips 41 and a plurality of second LED chips 42, and the resistor group 5 includes a plurality of first resistor chips 51 and a plurality of second resistor chips 52. It should be noted that the first LED chips 41 have the same first working voltage, the second LED chips 42 have the same second working voltage, and the first working voltage of the first LED chip 41 is different from the second working voltage of the second LED 42. The first resistor chips 51 have the same first resistance value, the second resistor chips 52 have the same second resistance value, and the first resistance value of the first resistor chip 51 is different from the second resistance value of the second resistor chip 52. Each of the first LED chips 41 corresponds to one of the first resistor chips 51, and each of the second LED chips 42 corresponds to one of the second resistor chips 52. Therefore, when the power supply P is controlled to stop supplying power to the LED illumination device D, the residual capacitance remaining in the capacitor 6 can be released by cooperation of the first resistor chips 51 and the second resistor chips 52, so that all of the first LED chips 41 and the second LED chips 42 can be completely turned off within a predetermined number of seconds without generating a light source (such as micro light, weak light, or low light).

First Embodiment

Referring to FIG. 1 to FIG. 4, a first embodiment of the present disclosure provides an LED illumination device D for rapidly releasing residual capacitance, which includes a circuit substrate 1, a bridge rectifier chip 2, a current-limiting chip 3, a light-emitting group 4, a resistor group 5 and a capacitor 6.

Figure 2:
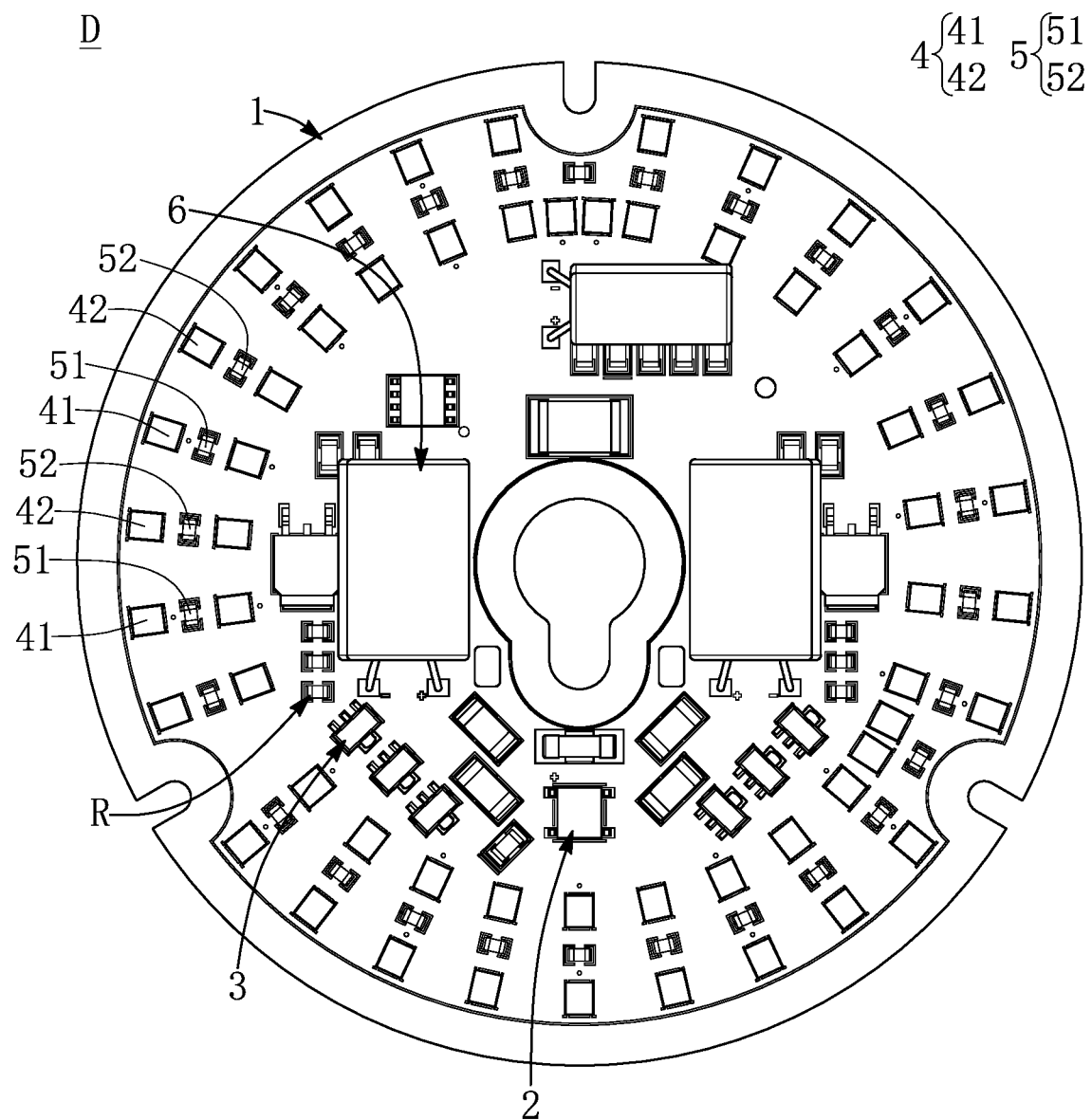
FIG. 2 is a schematic top view of the LED illumination device for rapidly releasing residual capacitance according to the first embodiment of the present disclosure.
Figure 3:
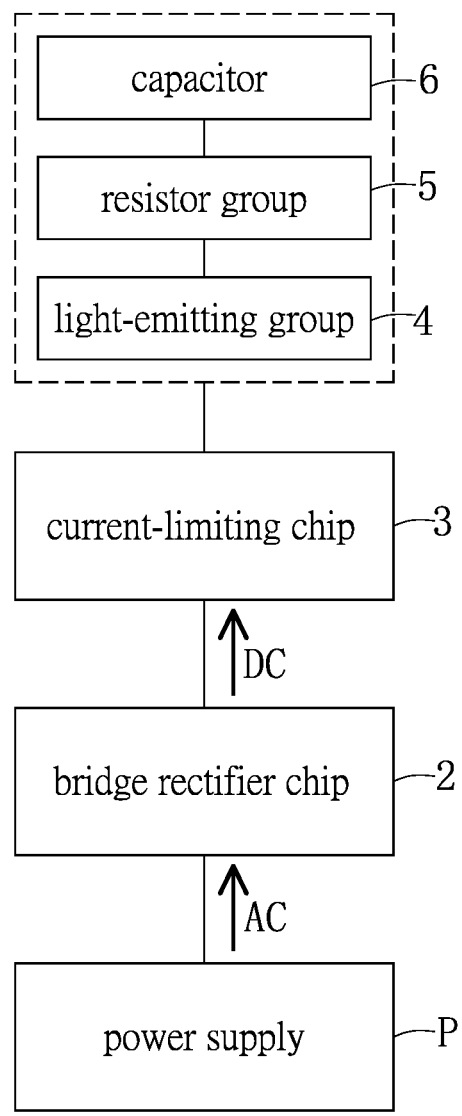
FIG. 3 is a functional block diagram of the LED illumination device for rapidly releasing residual capacitance according to the first embodiment of the present disclosure.

Firstly, referring to FIG. 1 to FIG. 3, the bridge rectifier chip 2 is disposed on the circuit substrate 1, for converting an alternating current AC provided by a power supply P into a direct current DC. For example, the bridge rectifier chip 2 (or a chip-type bridge rectifier) is electrically connected to the circuit substrate 1, and the bridge rectifier chip 2 can be any type of rectifier for converting the alternating current into the direct current so as to provide the direct current required by the LED illumination device D. However, the aforementioned details are disclosed for exemplary purposes only, and are not meant to limit the scope of the present disclosure.

Figure 4:
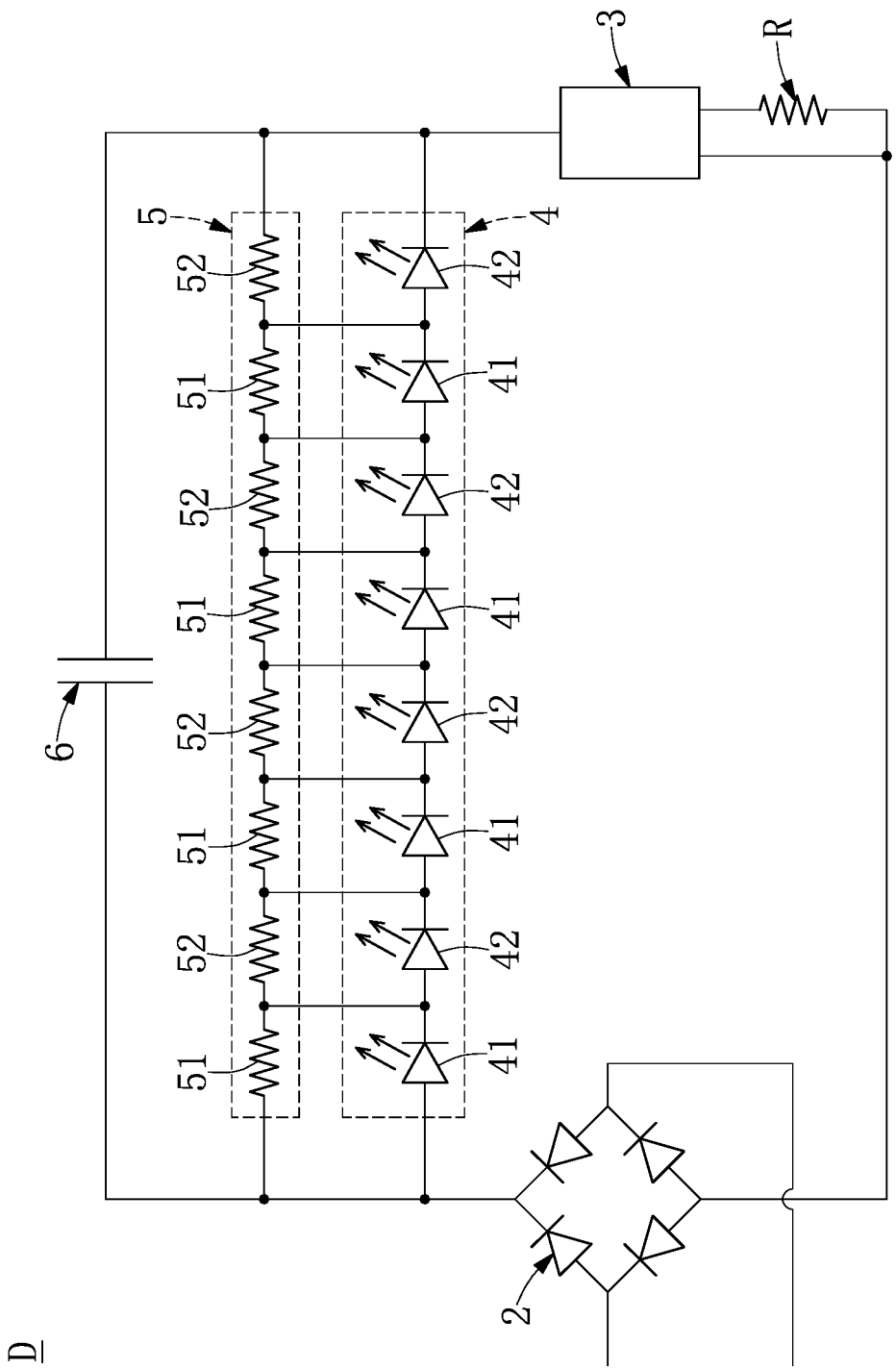
FIG. 4 is a schematic circuit diagram of the LED illumination device for rapidly releasing residual capacitance according to the first embodiment of the present disclosure.

Moreover, referring to FIG. 1, FIG. 3 and FIG. 4, the current-limiting chip 3 is disposed on the circuit substrate 1 and electrically connected to the bridge rectifier chip 2, for limiting the current quantity (the amount of current) of the direct current. For example, the current-limiting chip 3 (or a chip-type current-limiting IC) is electrically connected to at least one current-limiting resistor R, and the least one current-limiting resistor R can be configured to set the current-limiting value of the current-limiting chip 3. However, the aforementioned details are disclosed for exemplary purposes only, and are not meant to limit the scope of the present disclosure.

In addition, referring to FIG. 1, FIG. 3 and FIG. 4, the light-emitting group 4 includes a plurality of first LED chips 41 and a plurality of second LED chips 42, and all of the first LED chips 41 and the second LED chips 42 are disposed on the circuit substrate 1 and electrically connected between the bridge rectifier chip 2 and the current-limiting chip 3. More particularly, the first LED chips 41 have the same first working voltage (or the same first operating voltage), the second LED chips 42 have the same second working voltage (or the same second operating voltage), and the first working voltage of the first LED chip 41 is different from the second working voltage of the second LED 42. For example, as shown in FIG. 4, the first LED chips 41 and the second LED chips 42 can be used to provide light sources with the same or different wavelengths, and the first LED chips 41 and the second LED chips 42 can be alternately arranged in series by an alternate arrangement manner. However, the aforementioned details are disclosed for exemplary purposes only, and are not meant to limit the scope of the present disclosure.

Furthermore, referring to FIG. 1, FIG. 3 and FIG. 4, the resistor group 5 includes a plurality of first resistor chips 51 and a plurality of second resistor chips 52, and all of the first resistor chips 51 and the second resistor chips 52 are disposed on the circuit substrate 1 and electrically connected between the bridge rectifier chip 2 and the current-limiting chip 3. More particularly, the first resistor chips 51 have the same first resistance value, the second resistor chips 52 have the same second resistance value, and the first resistance value of the first resistor chip 51 is different from the second resistance value of the second resistor chip 52. For example, as shown in FIG. 4, the first resistor chips 51 and the second resistor chips 52 can be chip-type variable resistors or chip-type fixed resistors, and the first resistor chips 51 and the second resistor chips 52 can be alternately arranged in series by an alternate arrangement manner. However, the aforementioned details are disclosed for exemplary purposes only, and are not meant to limit the scope of the present disclosure.

Moreover, referring to FIG. 1, FIG. 3 and FIG. 4, the capacitor 6 is disposed on the circuit substrate 1 and electrically connected between the bridge rectifier chip 2 and the current-limiting chip 3, and the light-emitting group 4, the resistor group 5 and the capacitor 6 are arranged in parallel. For example, the capacitor 6 can be an aluminum electrolytic capacitor, a multilayer ceramic capacitor, a tantalum capacitor, a film capacitor or other types of capacitors, and the present disclosure can also use a plurality of capacitors arranged in series. However, the aforementioned details are disclosed for exemplary purposes only, and are not meant to limit the scope of the present disclosure.

It should be noted that as shown in FIG. 4, each of the first LED chips 41 can correspond to one of the first resistor chips 51, and each of the second LED chips 42 can correspond to one of the second resistor chips 52. More particularly, the first LED chips 41 can respectively correspond to the first resistor chips 51, and each of the first LED chips 41 and the corresponding one of the first resistor chips 51 can be arranged in parallel. The second LED chips 42 can respectively correspond to the second resistor chips 52, and each of the second LED chips 42 and the corresponding one of the second resistor chips 52 can be arranged in parallel. For example, when the first working voltage (such as 9V) of the first LED chip 41 is greater than the second working voltage (such as 3V) of the second LED chip 42, the first resistance value (such as 36Ω) of the first resistor chip 51 is greater than the second resistance value (such as 12Ω) of the second resistor chip 52. Conversely, when the first working voltage (such as 3V) of the first LED chip 41 is smaller than the second working voltage (such as 9V) of the second LED chip 42, the first resistance value (such as 12Ω) of the first resistor chip 51 is smaller than the second resistance value (such as 36Ω) of the second resistor chip 52. In addition, a ratio (such as 1/3) of the first working voltage (such as 3V) of the first LED chip 41 to the second working voltage (such as 9V) of the second LED chip 42 is substantially equal to a ratio (such as 1/3) of the first resistance value (such as 12Ω) of the first resistor chip 51 to the second resistance value (such as 6Ω) of the second resistor chip 52. However, the aforementioned details are disclosed for exemplary purposes only, and are not meant to limit the scope of the present disclosure.

Therefore, referring to FIG. 3 and FIG. 4, when the power supply P is configured to stop supplying power to the LED illumination device D (or when the power of the LED illumination device D is turned off), the residual capacitance remaining in the capacitor 6 can be released by cooperation of the first resistor chips 51 and the second resistor chips 52 (or can disappear through of the absorption the first resistor chips 51 and the second resistor chips 52), so that all of the first LED chips 41 and the second LED chips 42 can be completely shut down and no longer produce a light source within a predetermined number of seconds (for example, within 2 seconds, including 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 seconds). That is to say, in the present disclosure, the low light generated by the first LED chips 41 and the second LED chips 42 can disappear completely and quickly through the use of the first resistor chips 51 and the second resistor chips 52.

Second Embodiment

Figure 5:
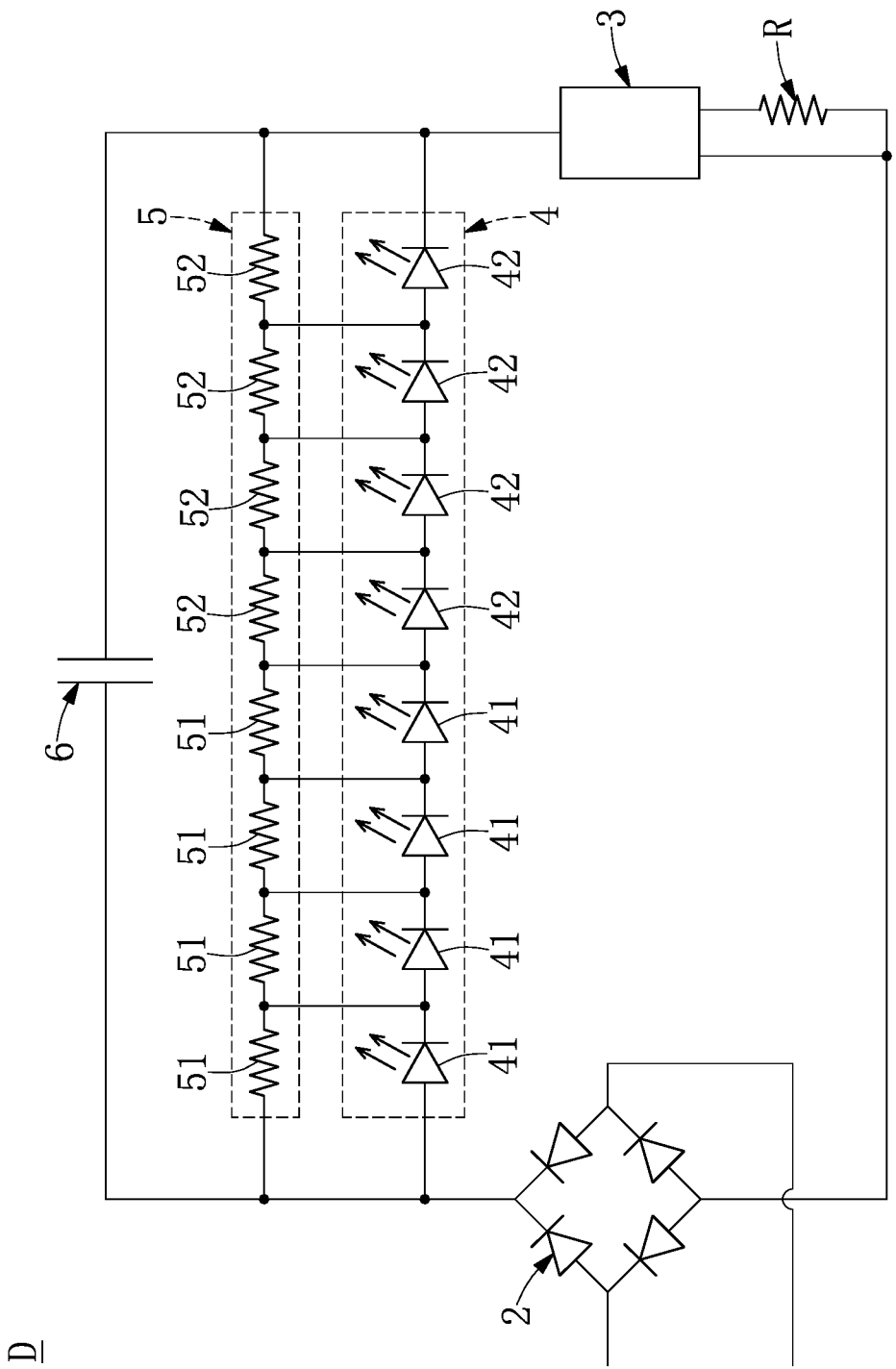
FIG. 5 is a schematic circuit diagram of the LED illumination device for rapidly releasing residual capacitance according to a second embodiment of the present disclosure.

Referring to FIG. 5, a second embodiment of the present disclosure provides an LED illumination device D for rapidly releasing residual capacitance, which includes a circuit substrate 1, a bridge rectifier chip 2, a current-limiting chip 3, a light-emitting group 4, a resistor group 5 and a capacitor 6. Comparing FIG. 5 with FIG. 4, the main difference between the second embodiment and the first embodiment is as follows: in the second embodiment, the first LED chips 41 can be sequentially arranged in series to form a first light-emitting group (not labeled), and the first resistor chips 51 can be sequentially arranged in series to form a first resistor group (not labeled). In addition, the second LED chips 42 can be sequentially arranged in series to form a second light-emitting group (not labeled), and the second resistor chips 52 can be sequentially arranged in series to form a second resistor group (not labeled).

It should be noted that as shown in FIG. 5, the first light-emitting group including the first LED chips 41 can be electrically connected between the bridge rectifier chip 2 and the second light-emitting group, and the second light-emitting group including the second LED chips 42 can be electrically connected between the first light-emitting group and the current-limiting chip 3. In addition, the first resistor group including the first resistor chips 51 can be electrically connected between the bridge rectifier chip 2 and the second resistor group, and the second resistor group including the second resistor chips 52 can be electrically connected between the first resistor group and the current-limiting chip 3.

Third Embodiment

Figure 6:
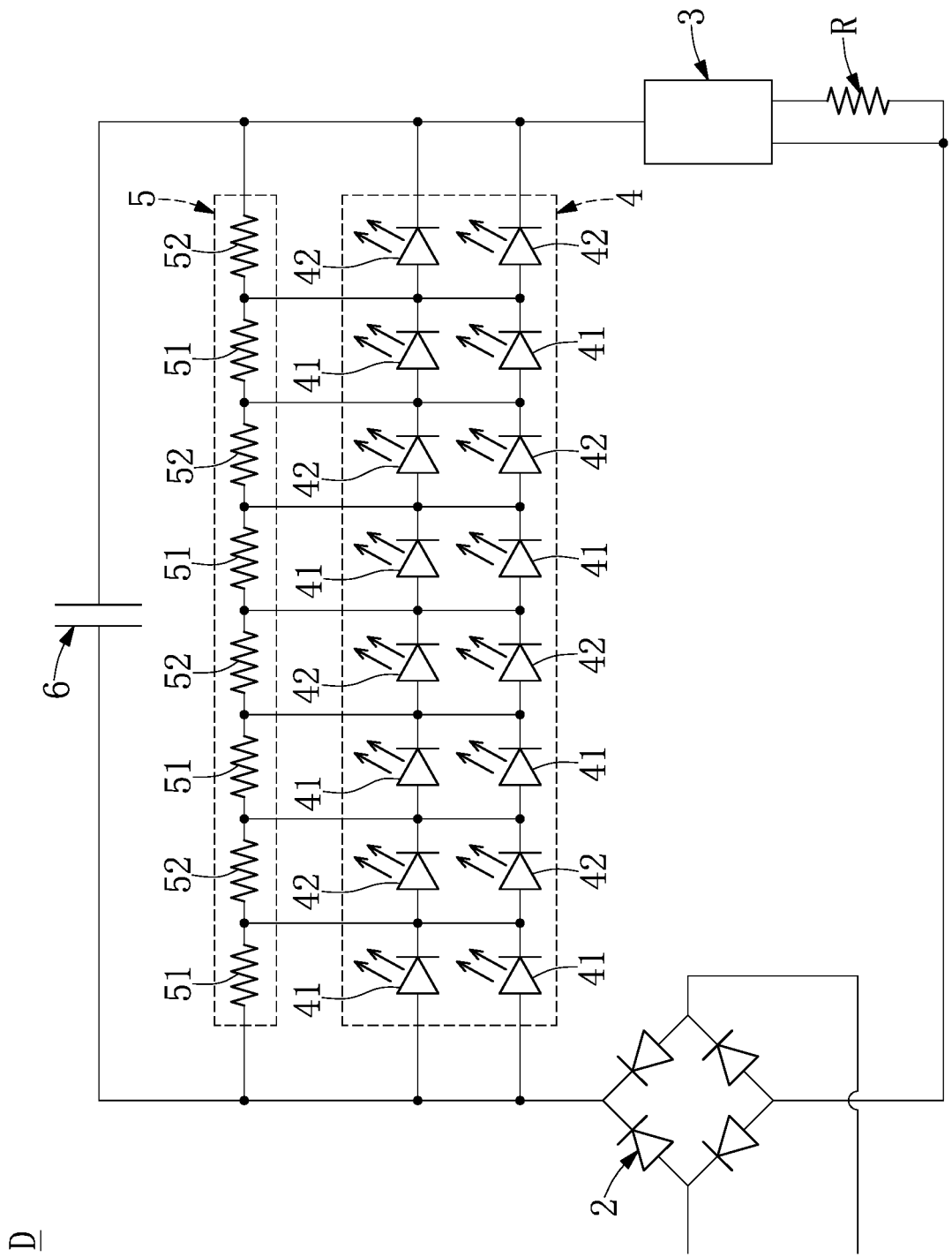
FIG. 6 is a schematic circuit diagram of the LED illumination device for rapidly releasing residual capacitance according to a third embodiment of the present disclosure.

Referring to FIG. 6, a third embodiment of the present disclosure provides an LED illumination device D for rapidly releasing residual capacitance, which includes a circuit substrate 1, a bridge rectifier chip 2, a current-limiting chip 3, a light-emitting group 4, a resistor group 5 and a capacitor 6. Comparing FIG. 6 with FIG. 4, the main difference between the third embodiment and the first embodiment is as follows: in the third embodiment, the first LED chips 41 can be divided into a plurality of first LED chip groups (not labeled), and each of the first LED chip groups includes at least two of the first LED chips 41 that are arranged in parallel. The second LED chips 42 can be divided into a plurality of second LED chip groups (not labeled), and each of the second LED chip groups includes at least two of the second LED chips 42 that are arranged in parallel. More particularly, the first LED chip groups can respectively correspond to the first resistor chips 51, and each of the first LED chip groups and the corresponding one of the first resistor chips 51 can be arranged in parallel. The second LED chip groups can respectively correspond to the second resistor chips 52, and each of the second LED chip groups and the corresponding one of the second resistor chips 52 can be arranged in parallel.

It should be noted that as shown in FIG. 6, the first LED chip groups (each of the first LED chip groups includes at least two of the first LED chips 41 that are arranged in parallel) can be alternately arranged in series, and the first resistor chips 51 can be alternately arranged in series. The second LED chip groups (each of the second LED chip groups includes at least two of the second LED chips 42 that are arranged in parallel) can be alternately arranged in series, and the second resistor chips 52 can be alternately arranged in series.

Fourth Embodiment

Figure 7:
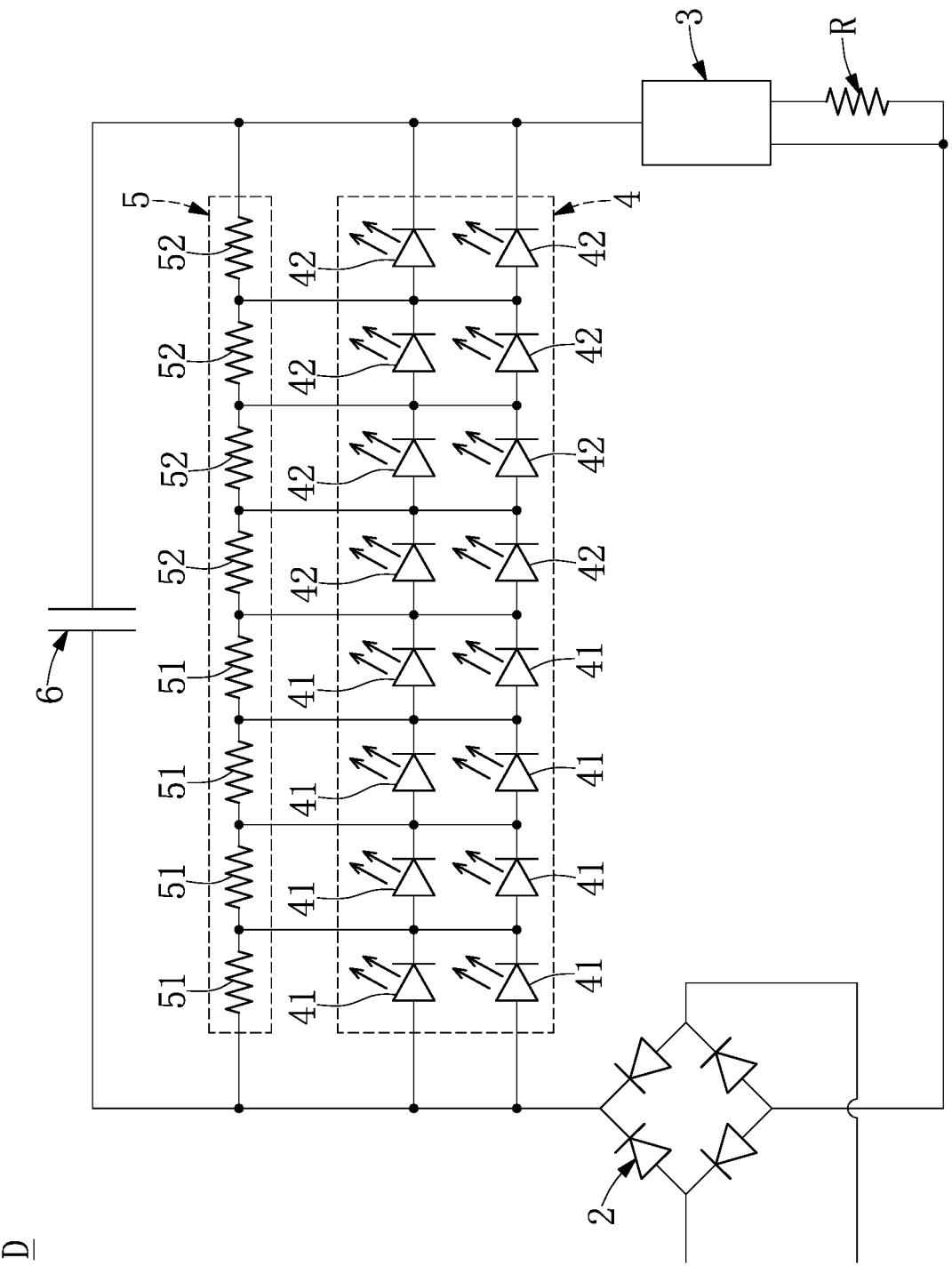
FIG. 7 is a schematic circuit diagram of the LED illumination device for rapidly releasing residual capacitance according to a fourth embodiment of the present disclosure.

Referring to FIG. 7, a fourth embodiment of the present disclosure provides an LED illumination device D for rapidly releasing residual capacitance, which includes a circuit substrate 1, a bridge rectifier chip 2, a current-limiting chip 3, a light-emitting group 4, a resistor group 5 and a capacitor 6. Comparing FIG. 7 with FIG. 6, the main difference between the fourth embodiment and the third embodiment is as follows: in the fourth embodiment, the first LED chip groups (each of the first LED chip groups includes at least two of the first LED chips 41 that are arranged in parallel) can be sequentially arranged in series to form a first light-emitting group (not labeled), and the first resistor chips 51 can be sequentially arranged in series to form a first resistor group (not labeled). In addition, the second LED chip groups (each of the second LED chip groups includes at least two of the second LED chips 42 that are arranged in parallel) can be sequentially arranged in series to form a second light-emitting group (not labeled), and the second resistor chips 52 can be sequentially arranged in series to form a second resistor group (not labeled).

It should be noted that as shown in FIG. 7, the first light-emitting group including the first LED chips 41 can be electrically connected between the bridge rectifier chip 2 and the second light-emitting group, and the second light-emitting group including the second LED chips 42 can be electrically connected between the first light-emitting group and the current-limiting chip 3. In addition, the first resistor group including the first resistor chips 51 can be electrically connected between the bridge rectifier chip 2 and the second resistor group, and the second resistor group including the second resistor chips 52 can be electrically connected between the first resistor group and the current-limiting chip 3.

Beneficial Effects of the Embodiments

In conclusion, in the LED illumination device D provided by the present disclosure, by virtue of the light-emitting group 4 including a plurality of first LED chips 41 and a plurality of second LED chips 42, the resistor group 5 including a plurality of first resistor chips 51 and a plurality of second resistor chips 52, the light-emitting group 4, the resistor group 5 and the capacitor 6 being arranged in parallel, the first working voltage of the first LED chip being different from the second working voltage of the second LED chip, the first resistance value of the first resistor chip being different from the second resistance value of the second resistor chip, each of the first LED chips 41 corresponding to one of the first resistor chips 51, and each of the second LED chips 42 corresponding to one of the second resistor chips 52, when the power supply is configured to stop supplying power to the LED illumination device D, the residual capacitance remaining in the capacitor 6 is released by cooperation of the first resistor chips 51 and the second resistor chips 52, so that all of the first LED chips 41 and the second LED chips 42 are completely turned off within a predetermined time without generating any light source.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An LED illumination device for rapidly releasing residual capacitance, comprising:
    a circuit substrate;
    a bridge rectifier chip disposed on the circuit substrate, for converting an alternating current provided by a power supply into a direct current;
    a current-limiting chip disposed on the circuit substrate and electrically connected to the bridge rectifier chip and at least one current-limiting resistor, for limiting a current quantity of the direct current;
    a light-emitting group including a plurality of first LED chips and a plurality of second LED chips, wherein all of the first LED chips and the second LED chips are disposed on the circuit substrate and electrically connected between the bridge rectifier chip and the current-limiting chip;
    a resistor group including a plurality of first resistor chips and a plurality of second resistor chips, wherein all of the first resistor chips and the second resistor chips are disposed on the circuit substrate and electrically connected between the bridge rectifier chip and the current-limiting chip; and
    a capacitor disposed on the circuit substrate and electrically connected between the bridge rectifier chip and the current-limiting chip;
    wherein the light-emitting group, the resistor group and the capacitor are arranged in parallel;
    wherein the first LED chips have a same first working voltage, the second LED chips have a same second working voltage, and the first working voltage of the first LED chip is different from the second working voltage of the second LED;
    wherein the first resistor chips have a same first resistance value, the second resistor chips have a same second resistance value, and the first resistance value of the first resistor chip is different from the second resistance value of the second resistor chip;

wherein each of the first LED chips corresponds to one of the first resistor chips, and each of the second LED chips corresponds to one of the second resistor chips;

wherein, when the power supply is configured to stop supplying power to the LED illumination device, the residual capacitance remaining in the capacitor is released by cooperation of the first resistor chips and the second resistor chips, so that all of the first LED chips and the second LED chips are completely turned off within 2 seconds without generating a light source.

2. The LED illumination device according to claim 1, wherein the first LED chips respectively correspond to the first resistor chips, and each of the first LED chips and the corresponding one of the first resistor chips are arranged in parallel;

wherein the second LED chips respectively correspond to the second resistor chips, and each of the second LED chips and the corresponding one of the second resistor chips are arranged in parallel;

wherein the first LED chips and the second LED chips are alternately arranged in series, and the first resistor chips and the second resistor chips are alternately arranged in series;

wherein, when the first working voltage of the first LED chip is greater than the second working voltage of the second LED chip, the first resistance value of the first resistor chip is greater than the second resistance value of the second resistor chip;

wherein, when the first working voltage of the first LED chip is smaller than the second working voltage of the second LED chip, the first resistance value of the first resistor chip is smaller than the second resistance value of the second resistor chip;

wherein a ratio of the first working voltage of the first LED chip to the second working voltage of the second LED chip is equal to a ratio of the first resistance value of the first resistor chip to the second resistance value of the second resistor chip.

3. The LED illumination device according to claim 1, wherein the first LED chips respectively correspond to the first resistor chips, and each of the first LED chips and the corresponding one of the first resistor chips are arranged in parallel;

wherein the second LED chips respectively correspond to the second resistor chips, and each of the second LED chips and the corresponding one of the second resistor chips are arranged in parallel;

wherein, the first LED chips are sequentially arranged in series to form a first light-emitting group, and the first resistor chips are sequentially arranged in series to form a first resistor group;

wherein, the second LED chips are sequentially arranged in series to form a second light-emitting group, and the second resistor chips are sequentially arranged in series to form a second resistor group;

wherein the first light-emitting group is electrically connected between the bridge rectifier chip and the second light-emitting group, and the second light-emitting group is electrically connected between the first light-emitting group and the current-limiting chip;

wherein the first resistor group is electrically connected between the bridge rectifier chip and the second resistor group, and the second resistor group is electrically connected between the first resistor group and the current-limiting chip;

wherein, when the first working voltage of the first LED chip is greater than the second working voltage of the second LED chip, the first resistance value of the first resistor chip is greater than the second resistance value of the second resistor chip;

wherein, when the first working voltage of the first LED chip is smaller than the second working voltage of the second LED chip, the first resistance value of the first resistor chip is smaller than the second resistance value of the second resistor chip;

wherein a ratio of the first working voltage of the first LED chip to the second working voltage of the second LED chip is equal to a ratio of the first resistance value of the first resistor chip to the second resistance value of the second resistor chip.

4. The LED illumination device according to claim 1, wherein the first LED chips are divided into a plurality of first LED chip groups, and each of the first LED chip groups includes at least two of the first LED chips arranged in parallel;

wherein the second LED chips are divided into a plurality of second LED chip groups, and each of the second LED chip groups includes at least two of the second LED chips arranged in parallel;

wherein the first LED chip groups respectively correspond to the first resistor chips, and each of the first LED chip groups and the corresponding one of the first resistor chips are arranged in parallel;

wherein the second LED chip groups respectively correspond to the second resistor chips, and each of the second LED chip groups and the corresponding one of the second resistor chips are arranged in parallel;

wherein the first LED chip groups are alternately arranged in series, and the first resistor chips are alternately arranged in series;

wherein the second LED chip groups are alternately arranged in series, and the second resistor chips are alternately arranged in series;

wherein, when the first working voltage of the first LED chip is greater than the second working voltage of the second LED chip, the first resistance value of the first resistor chip is greater than the second resistance value of the second resistor chip;

wherein, when the first working voltage of the first LED chip is smaller than the second working voltage of the second LED chip, the first resistance value of the first resistor chip is smaller than the second resistance value of the second resistor chip;

wherein a ratio of the first working voltage of the first LED chip to the second working voltage of the second LED chip is equal to a ratio of the first resistance value of the first resistor chip to the second resistance value of the second resistor chip.

5. The LED illumination device according to claim 1, wherein the first LED chips are divided into a plurality of first LED chip groups, and each of the first LED chip groups includes at least two of the first LED chips arranged in parallel;

wherein the second LED chips are divided into a plurality of second LED chip groups, and each of the second LED chip groups includes at least two of the second LED chips arranged in parallel;

wherein the first LED chip groups respectively correspond to the first resistor chips, and each of the first LED chip groups and the corresponding one of the first resistor chips are arranged in parallel;

wherein the second LED chip groups respectively correspond to the second resistor chips, and each of the second LED chip groups and the corresponding one of the second resistor chips are arranged in parallel;

wherein, the first LED chip groups are sequentially arranged in series to form a first light-emitting group, and the first resistor chips are sequentially arranged in series to form a first resistor group;

wherein, the second LED chip groups are sequentially arranged in series to form a second light-emitting group, and the second resistor chips are sequentially arranged in series to form a second resistor group;

wherein the first light-emitting group is electrically connected between the bridge rectifier chip and the second light-emitting group, and the second light-emitting group is electrically connected between the first light-emitting group and the current-limiting chip;

wherein the first resistor group is electrically connected between the bridge rectifier chip and the second resistor group, and the second resistor group is electrically connected between the first resistor group and the current-limiting chip;

wherein, when the first working voltage of the first LED chip is greater than the second working voltage of the second LED chip, the first resistance value of the first resistor chip is greater than the second resistance value of the second resistor chip;

wherein, when the first working voltage of the first LED chip is smaller than the second working voltage of the second LED chip, the first resistance value of the first resistor chip is smaller than the second resistance value of the second resistor chip;

wherein a ratio of the first working voltage of the first LED chip to the second working voltage of the second LED chip is equal to a ratio of the first resistance value of the first resistor chip to the second resistance value of the second resistor chip.

6. An LED illumination device for rapidly releasing residual capacitance, comprising:
a bridge rectifier chip;
a current-limiting chip electrically connected to the bridge rectifier chip;
a light-emitting group electrically connected between the bridge rectifier chip and the current-limiting chip, wherein the light-emitting group includes a plurality of first LED chips and a plurality of second LED chips;
a resistor group electrically connected between the bridge rectifier chip and the current-limiting chip, wherein the resistor group includes a plurality of first resistor chips and a plurality of second resistor chips; and
a capacitor electrically connected between the bridge rectifier chip and the current-limiting chip;
wherein the light-emitting group, the resistor group and the capacitor are arranged in parallel;
wherein the first LED chips have a same first working voltage, the second LED chips have a same second working voltage, and the first working voltage of the first LED chip is different from the second working voltage of the second LED;
wherein the first resistor chips have a same first resistance value, the second resistor chips have a same second resistance value, and the first resistance value of the first resistor chip is different from the second resistance value of the second resistor chip;
wherein each of the first LED chips corresponds to one of the first resistor chips, and each of the second LED chips corresponds to one of the second resistor chips.

7. The LED illumination device according to claim 6,
wherein the first LED chips respectively correspond to the first resistor chips, and each of the first LED chips and the corresponding one of the first resistor chips are arranged in parallel;
wherein the second LED chips respectively correspond to the second resistor chips, and each of the second LED chips and the corresponding one of the second resistor chips are arranged in parallel;
wherein the first LED chips and the second LED chips are alternately arranged in series, and the first resistor chips and the second resistor chips are alternately arranged in series;
wherein, when the first working voltage of the first LED chip is greater than the second working voltage of the second LED chip, the first resistance value of the first resistor chip is greater than the second resistance value of the second resistor chip;
wherein, when the first working voltage of the first LED chip is smaller than the second working voltage of the second LED chip, the first resistance value of the first resistor chip is smaller than the second resistance value of the second resistor chip;
wherein a ratio of the first working voltage of the first LED chip to the second working voltage of the second LED chip is equal to a ratio of the first resistance value of the first resistor chip to the second resistance value of the second resistor chip.

8. The LED illumination device according to claim 6,
wherein the first LED chips respectively correspond to the first resistor chips, and each of the first LED chips and the corresponding one of the first resistor chips are arranged in parallel;
wherein the second LED chips respectively correspond to the second resistor chips, and each of the second LED chips and the corresponding one of the second resistor chips are arranged in parallel;
wherein, the first LED chips are sequentially arranged in series to form a first light-emitting group, and the first resistor chips are sequentially arranged in series to form a first resistor group;
wherein, the second LED chips are sequentially arranged in series to form a second light-emitting group, and the second resistor chips are sequentially arranged in series to form a second resistor group;
wherein the first light-emitting group is electrically connected between the bridge rectifier chip and the second light-emitting group, and the second light-emitting group is electrically connected between the first light-emitting group and the current-limiting chip;
wherein the first resistor group is electrically connected between the bridge rectifier chip and the second resistor group, and the second resistor group is electrically connected between the first resistor group and the current-limiting chip;
wherein, when the first working voltage of the first LED chip is greater than the second working voltage of the second LED chip, the first resistance value of the first resistor chip is greater than the second resistance value of the second resistor chip;
wherein, when the first working voltage of the first LED chip is smaller than the second working voltage of the second LED chip, the first resistance value of the first resistor chip is smaller than the second resistance value of the second resistor chip;
wherein a ratio of the first working voltage of the first LED chip to the second working voltage of the second LED chip is equal to a ratio of the first resistance value of the first resistor chip to the second resistance value of the second resistor chip.

9. The LED illumination device according to claim 6,
wherein the first LED chips are divided into a plurality of first LED chip groups, and each of the first LED chip groups includes at least two of the first LED chips arranged in parallel;
wherein the second LED chips are divided into a plurality of second LED chip groups, and each of the second LED chip groups includes at least two of the second LED chips arranged in parallel;
wherein the first LED chip groups respectively correspond to the first resistor chips, and each of the first LED chip groups and the corresponding one of the first resistor chips are arranged in parallel;
wherein the second LED chip groups respectively correspond to the second resistor chips, and each of the second LED chip groups and the corresponding one of the second resistor chips are arranged in parallel;
wherein the first LED chip groups are alternately arranged in series, and the first resistor chips are alternately arranged in series;
wherein the second LED chip groups are alternately arranged in series, and the second resistor chips are alternately arranged in series;
wherein, when the first working voltage of the first LED chip is greater than the second working voltage of the second LED chip, the first resistance value of the first resistor chip is greater than the second resistance value of the second resistor chip;
wherein, when the first working voltage of the first LED chip is smaller than the second working voltage of the second LED chip, the first resistance value of the first resistor chip is smaller than the second resistance value of the second resistor chip;
wherein a ratio of the first working voltage of the first LED chip to the second working voltage of the second LED chip is equal to a ratio of the first resistance value of the first resistor chip to the second resistance value of the second resistor chip.

10. The LED illumination device according to claim 6,
wherein the first LED chips are divided into a plurality of first LED chip groups, and each of the first LED chip groups includes at least two of the first LED chips arranged in parallel;
wherein the second LED chips are divided into a plurality of second LED chip groups, and each of the second LED chip groups includes at least two of the second LED chips arranged in parallel;
wherein the first LED chip groups respectively correspond to the first resistor chips, and each of the first LED chip groups and the corresponding one of the first resistor chips are arranged in parallel;
wherein the second LED chip groups respectively correspond to the second resistor chips, and each of the second LED chip groups and the corresponding one of the second resistor chips are arranged in parallel;
wherein, the first LED chip groups are sequentially arranged in series to form a first light-emitting group, and the first resistor chips are sequentially arranged in series to form a first resistor group;
wherein, the second LED chip groups are sequentially arranged in series to form a second light-emitting group, and the second resistor chips are sequentially arranged in series to form a second resistor group;
wherein the first light-emitting group is electrically connected between the bridge rectifier chip and the second light-emitting group, and the second light-emitting group is electrically connected between the first light-emitting group and the current-limiting chip;
wherein the first resistor group is electrically connected between the bridge rectifier chip and the second resistor group, and the second resistor group is electrically connected between the first resistor group and the current-limiting chip;
wherein, when the first working voltage of the first LED chip is greater than the second working voltage of the second LED chip, the first resistance value of the first resistor chip is greater than the second resistance value of the second resistor chip;
wherein, when the first working voltage of the first LED chip is smaller than the second working voltage of the second LED chip, the first resistance value of the first resistor chip is smaller than the second resistance value of the second resistor chip;
wherein a ratio of the first working voltage of the first LED chip to the second working voltage of the second LED chip is equal to a ratio of the first resistance value of the first resistor chip to the second resistance value of the second resistor chip.

\* \* \* \* \*